United States Patent [19]

Hsiao et al.

[11] Patent Number: 5,668,276
[45] Date of Patent: Sep. 16, 1997

[54] HYDROXYGALLIUM PHTHALOCYANINE PROCESSES

[75] Inventors: Cheng-Kuo Hsiao; Ah-Mee Hor, both of Mississauga; Sandra J. Gardner, Willowdale; Roger E. Gaynor, Oakville; Jacques Poitras, L'Assomption, all of Canada

[73] Assignee: Xerox Corporation, Stamford, Conn.

[21] Appl. No.: 688,135

[22] Filed: Jul. 29, 1996

Related U.S. Application Data

[62] Division of Ser. No. 413,554, Mar. 30, 1995, Pat. No. 5,567,558.
[51] Int. Cl.$^6$ .................................................. C09B 47/04
[52] U.S. Cl. ........................... 540/144; 540/142; 540/143
[58] Field of Search ........................................ 540/141, 142, 540/143

[56] References Cited

U.S. PATENT DOCUMENTS

| 5,393,629 | 2/1995 | Nukada et al. | 430/76 |
| 5,407,766 | 4/1995 | Mayo et al. | 430/58 |
| 5,482,811 | 1/1996 | Kedshkerian | 540/141 |
| 5,567,558 | 10/1996 | Hsiao et al. | 430/58 |

*Primary Examiner*—Mukund J. Shah
*Assistant Examiner*—Pavanaram K. Sripada
*Attorney, Agent, or Firm*—E. O. Palazzo

[57] ABSTRACT

A process for the preparation of hydroxygallium phthalocyanines Type A, Type B, Type C, or Type D, which comprises contacting Type V hydroxygallium phthalocyanine with an alcohol.

22 Claims, 3 Drawing Sheets

Diffraction Intensity (counts)

Diffraction Intensity (counts)

HYDROXYGALLIUM PHTHALOCYANINE PROCESSES

This is a division, of application Ser. No. 413,554, filed Mar. 30, 1995 U.S. Pat. No. 5,567,558.

BACKGROUND OF THE INVENTION

This invention is generally directed to hydroxygallium phthalocyanines and photoconductive imaging members thereof, and, more specifically, the present invention is directed to processes for the preparation of hydroxygallium phthalocyanines, including new crystalline forms thereof, by mixing hydroxygallium phthalocyanine Type V with an aliphatic alcohol, and wherein the alcohol is preferably methanol, ethanol, propanol, or butanol. More preferably, in embodiments the propanol is isopropanol, and the butanol is n-butanol. The photogenerating hydroxygallium phthalocyanine pigments resulting possess in embodiments a wide range of photosensitivities and with an $E_{1/2}$ of about 2 to 75 ergs/cm$^2$. The Type V hydroxygallium phthalocyanine can be prepared by a number of processes such as the formation of a precursor gallium phthalocyanine with, for example, an X-ray powder diffraction trace having peaks at Bragg angles 2Θ of 7.6, 8.1, 9.7, 16.0, 18.4, 19.2, 19.9, 24.7, 25.7 and 26.2, and the highest peak at 8.1 degrees, prepared by the reaction of 1,3-diiminoisoindolene with gallium acetylacetonate in a suitable solvent, such as N-methylpyrrolidone, or halonaphthalene like 1-chloronaphthalene, quinoline, and the like; hydrolyzing the precursor by dissolving in a strong acid and then reprecipitating the resulting dissolved pigment in aqueous ammonia, thereby forming Type I hydroxygallium phthalocyanine; and admixing the Type I formed with a hydrophobic solvent of, for example, hexanes, including 1-hexanes and/or isomers thereof, heptane, cyclohexane, cyclopentane or esters, such as propylacetate, butylacetate, or ketones such as methyl isobutyl ketone, methyl isoamyl ketone, or toluene, and thereafter azeotropically removing water therefrom. In embodiments, the Type V can be prepared by the formation of a precursor prepared by the reaction of 1 part gallium acetylacetonate with from about 1 part to about 10 parts and preferably about 4 parts of 1,3-diiminoisoindolene in a solvent, such as quinoline, chloronaphthalene, or N-methylpyrrolidone, in an amount of from about 10 parts to about 100 parts and preferably about 19 parts, for each part of gallium acetylacetonate that is used, to provide a pigment precursor gallium phthalocyanine, which is subsequently washed with a component, such as dimethylformamide to provide the precursor gallium phthalocyanine as determined by X-ray powder diffraction, with an X-ray powder diffraction trace having peaks at Bragg angles 2Θ of 7.6, 8.1, 9.7, 16.0, 18.4, 19.2, 19.9, 24.7, 25.7, and 26.2, and the highest peak at 8.1 degrees; dissolving 1 weight part of the resulting gallium phthalocyanine in concentrated, about 94 percent, sulfuric acid in an amount of from about 1 weight part to about 100 weight parts and in an embodiment about 5 weight parts by stirring the pigment precursor gallium phthalocyanine in the acid for an effective period of time, from about 30 seconds to about 24 hours, and in an embodiment about 2 hours at a temperature of from about 0° C. to about 75° C., and preferably about 40° C. in air or under an inert atmosphere, such as argon or nitrogen; adding the resulting mixture to a stirred organic solvent in a dropwise manner at a rate of about 0.5 milliliter per minute to about 10 milliliters per minute and in an embodiment about 1 milliliter per minute to a nonsolvent, which can be a mixture comprised of from about 1 volume part to about 10 volume parts and preferably about 4 volume parts of concentrated aqueous ammonia solution (14.8N) and from about 1 volume part to about 10 volume parts, and preferably about 7 volume parts of water for each volume part of acid like sulfuric acid that was used, which solvent mixture was chilled to a temperature of from about –25° C. to about 10° C. and in an embodiment about –5° C. while being stirred at a rate sufficient to create a vortex extending to the bottom of the flask containing the solvent mixture; isolating the resulting blue pigment by, for example, filtration; and washing the hydroxygallium phthalocyanine product obtained with deionized water by redispersing and filtering from portions of deionized water, which portions are from about 10 volume parts to about 400 volume parts and in an embodiment about 200 volume parts for each weight part of precursor pigment gallium phthalocyanine which was used. The product, a dark blue solid, was confirmed to be Type I hydroxygallium phthalocyanine on the basis of its X-ray diffraction pattern having major peaks at Bragg angles 2Θ of 6.9, 13.1, 16.4, 21.0, 26.4, and the highest peak at 6.9 degrees. The Type I hydroxygallium phthalocyanine product obtained as a wet cake, approximately 10 percent by weight pigment and 90 percent by weight water, can then be dried by azeotropically distilling off water with a hydrophobic solvent, such as hexane, of from 1 part to 30 parts of wet cake to 100 parts by volume of solvent, preferably 20 parts. Water is removed by heating to the azeotrope boiling point and continued until the distillate temperature reaches the boiling point of the hydrophobic solvent. Further, in embodiments there can be selected as a reactant an alkoxy gallium phthalocyanine dimer, reference U.S. Pat. No. 5,521,306, U.S. Pat. No. 5,466,796 and U.S. Pat. No. 5,456,998 the disclosures of which are totally incorporated herein by reference.

In *Bull Soc Chim. Fr.*, 23 (1962), there is illustrated the preparation of hydroxygallium phthalocyanine via the precursor chlorogallium phthalocyanine. The precursor chlorogallium phthalocyanine is prepared by reaction of o-cyanobenzamide with gallium chloride in the absence of solvent. O-cyanobenzamide is heated to its melting point (172° C.), and to it is added gallium chloride at which time the temperature is increased to 210° C. for 15 minutes, and then cooled. The solid is recrystallized out of boiling chloronaphthalene to give purple crystals having carbon, hydrogen and chlorine analyses matching theoretical values for chlorogallium phthalocyanine. Dissolution in concentrated sulfuric acid, followed by reprecipitation in diluted aqueous ammonia, affords material having carbon, and hydrogen analyses matching theoretical values for hydroxygallium phthalocyanine.

In JPLO.221459, there are illustrated gallium phthalocyanine compounds which show the following intense diffraction peaks at Bragg angles (2 theta +/–0.2°) in the X-ray diffraction spectrum,

1—6.7, 15.2, 20.5, 27.0

2—6.7, 13.7, 16.3, 20.9, 26.3 (hydroxygallium phthalocyanine Type I)

3—7.5, 9.5, 11.0, 13.5, 19.1, 20.3, 21.8, 25.8, 27.1, 33.0 (chlorogallium phthalocyanine Type I).

Further, there is illustrated in JPLO.221459 a photoreceptor for use in electrophotography comprising a charge generation material and charge transport material on a conductive substrate, and the charge generation material comprising one or a mixture of two or more of gallium phthalocyanine compounds which show the following intense diffraction peaks at Bragg angles (2 theta +/–0.2°) in the X-ray diffraction spectrum,

1—6.7, 15.2, 20.5, 27.0

2—6.7, 13.7, 16.3, 20.9, 26.3

3—7.5,9.5,11.0,13.5,19.1,20.3,21.8,25.8,27.1,33.0.

In U.S. Pat. No. 5,473,064, the disclosure of which is totally incorporated herein by reference, there is illustrated a process for the preparation of hydroxygallium phthalocyanine Type V, essentially free of chlorine, whereby a pigment precursor Type I chlorogallium phthalocyanine is prepared by reaction of gallium chloride in a solvent such as N-methylpyrrolidone with 1,3-diiminoisoindolene ($DI^3$); hydrolyzing the pigment precursor chlorogallium phthalocyanine Type I by standard methods, for example acid pasting, whereby the pigment precursor is dissolved in concentrated sulfuric acid and then reprecipitated in a solvent, such as water, or a dilute ammonia solution; and subsequently treating the resulting hydrolyzed pigment hydroxygallium phthalocyanine Type I with a solvent, such as N,N-dimethylformamide by, for example, ball milling said Type I hydroxygallium phthalocyanine pigment in the presence of spherical glass beads, approximately 1 millimeter to 5 millimeters in diameter, at room temperature, about 25° C., for a period of from about 12 hours to about 1 week, and preferably about 24 hours such that there is obtained a hydroxygallium phthalocyanine Type V ball milling contains very low levels of residual chlorine of from about 0.001 percent to about 0.1 percent.

Further, in U.S. Pat. No. 5,482,811, the disclosure of which is totally incorporated herein by reference, there is illustrated a process for the preparation of hydroxygallium phthalocyanines which comprises hydrolyzing a gallium phthalocyanine precursor pigment by dissolving said hydroxygallium phthalocyanine in a strong acid and then reprecipitating the resulting dissolved pigment in basic aqueous media; removing any ionic species formed by washing with water, concentrating the resulting aqueous slurry comprised of water and hydroxygallium phthalocyanine to a wet cake; removing water from said slurry by azeotropic distillation with an organic solvent; and subjecting said resulting pigment slurry to mixing with the addition of a second solvent to cause the formation of said hydroxygallium phthalocyanine.

In copending application U.S. Ser. No. 537,714, the disclosure of which is totally incorporated herein by reference, there are illustrated photoresponsive imaging members with photogenerating titanyl phthalocyanine layers prepared by vacuum deposition. It is indicated in this copending application that the imaging members comprised of the vacuum deposited titanyl phthalocyanines and aryl amine hole transporting compounds exhibit superior xerographic performance with low dark decay characteristics and high photosensitivity, particularly in comparison to several prior art imaging members prepared by solution coating or spray coating, reference for example U.S. Pat. No. 4,429,029 mentioned hereinbefore.

The invention hydroxygallium phthalocyanines obtained can be selected as organic photogenerator pigments in layered photoresponsive imaging members with charge transport layers, especially hole transport layers containing hole transport molecules such as known tertiary aryl amines. The aforementioned photoresponsive, or photoconductive imaging members can be negatively charged when the photogenerating layer is situated between the hole transport layer and the substrate, or positively charged when the hole transport layer is situated between the photogenerating layer and the supporting substrate. The layered photoresponsive imaging members can be selected for a number of different known imaging and printing processes including, for example, electrophotographic imaging processes, especially xerographic imaging and printing processes wherein negatively charged or positively charged images are rendered visible using toner compositions of appropriate charge polarity. In general, the imaging members are sensitive in the wavelength region of from about 550 to about 900 nanometers, and in particular, from about 660 to about 850 nanometers, thus diode lasers can be selected as the light source. The xerographic electrical properties of the imaging members can be determined by known means, including as indicated herein electrostatically charging the surfaces thereof with a corona discharge source until the surface potentials, as measured by a capacitively coupled probe attached to an electrometer, attained an initial value $V_o$ of about −800 volts. After resting for 0.5 second in the dark, the charged members attained a surface potential of $V_{ddp}$, dark development potential. Each member can then be exposed to light from a filtered Xenon lamp with a XBO 150 watt bulb, thereby inducing a photodischarge which resulted in a reduction of surface potential to a $V_{bg}$ value, background potential. The percent of photodischarge was calculated as $100\times(V_{ddp}-V_{bg})/V_{ddp}$. The desired wavelength and energy of the exposed light was determined by the type of filters placed in front of the lamp. The monochromatic light photosensitivity was determined using a narrow band-pass filter. The photosensitivity of the imaging members is usually provided in terms of the amount of exposure energy in ergs/cm$^2$, designated as $E_{1/2}$ required to achieve 50 percent photodischarge from the dark development potential. The higher the photosensitivity, the smaller is the $E_{1/2}$ value.

Layered photoresponsive imaging members have been described in a number of U.S. Patents, such as U.S. Pat. No. 4,265,900, the disclosure of which is totally incorporated herein by reference, wherein there is illustrated an imaging member comprised of a photogenerating layer, and an aryl amine hole transport layer. Examples of photogenerating layer components include trigonal selenium, metal phthalocyanines, vanadyl phthalocyanines, and metal free phthalocyanines. Additionally, there is described in U.S. Pat. No. 3,121,006 a composite xerographic photoconductive member comprised of finely divided particles of a photoconductive inorganic compound dispersed in an electrically insulating organic resin binder. The binder materials disclosed in the '006 patent comprise a material which is incapable of transporting for any significant distance injected charge carriers generated by the photoconductive particles.

The disclosures of all of the aforementioned publications, laid open applications, copending applications and patents are totally incorporated herein by reference.

SUMMARY OF THE INVENTION

It is an object of the present invention to provide processes for the preparation of hydroxygallium phthalocyanine and imaging members thereof with many of the advantages illustrated herein.

Another object of the present invention relates to the provision of improved layered photoresponsive imaging members with photosensitivity to near infrared radiations.

It is yet another object of the present invention to provide simple and economical processes for the preparation of hydroxygallium phthalocyanines.

In a further object of the present invention there are provided processes for the preparation of hydroxygallium phthalocyanines with XRPD peaks at Bragg angles 2Θ of 6.9, 7.7, 8.4, 12.0, 13.2, 24.3, 26.6 and 27.5 degrees by treatment in methanol; 7.4, 8.2, 9.9, 12.4, 16.4, 18.5, 22.3, 24.6, 26.1 and 28.3 degrees by treatment in ethanol; 7.3, 8.1, 9.9, 12.4, 22.3, 25.1 and 28.2 degrees by treatment with isopropanol; or 7.1, 7.4, 9.1, 9.9, 12.4, 18.5, 22.2, 25.0, 26.2 and 28.2 degrees by contacting, mixing, or treatment with n-butanol.

In still a further object of the present invention there are provided photoresponsive imaging members with an aryl amine hole transport layer, and a photogenerator layer comprised of hydroxygallium phthalocyanine pigment components obtained by the processes illustrated herein.

Figure 1:
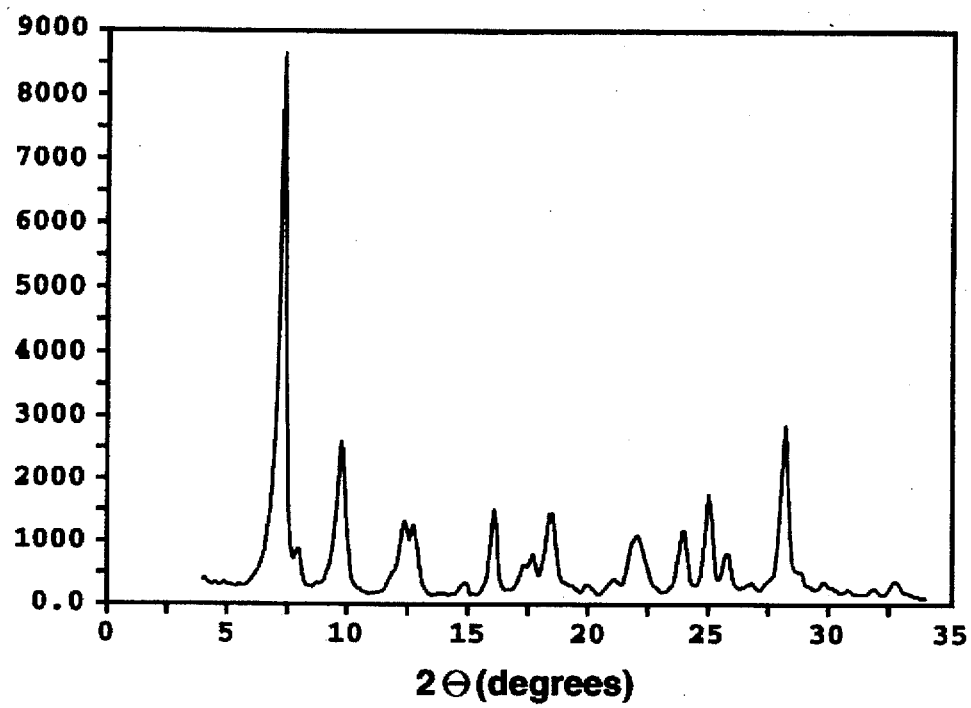
FIG. 1 represents an X-ray powder diffraction trace for the hydroxygallium phthalocyanine, Type V polymorph, prepared as described in Example I.
Figure 2:
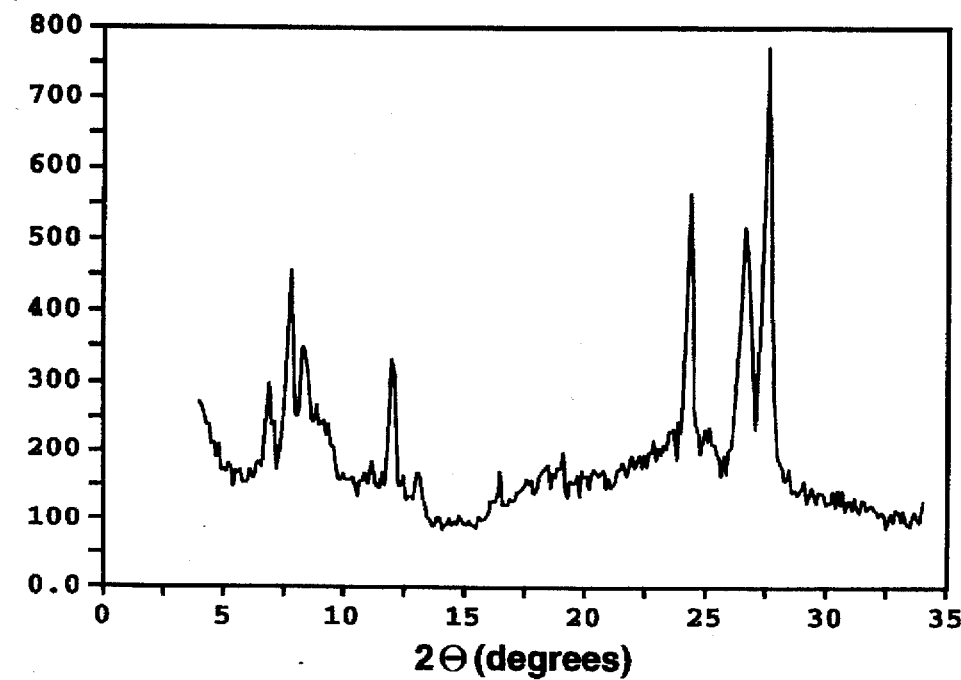
FIG. 2 represents an X-ray powder diffraction trace for the invention hydroxygallium phthalocyanine, Type A polymorph, prepared as described herein using methanol as solvent.
Figure 3:
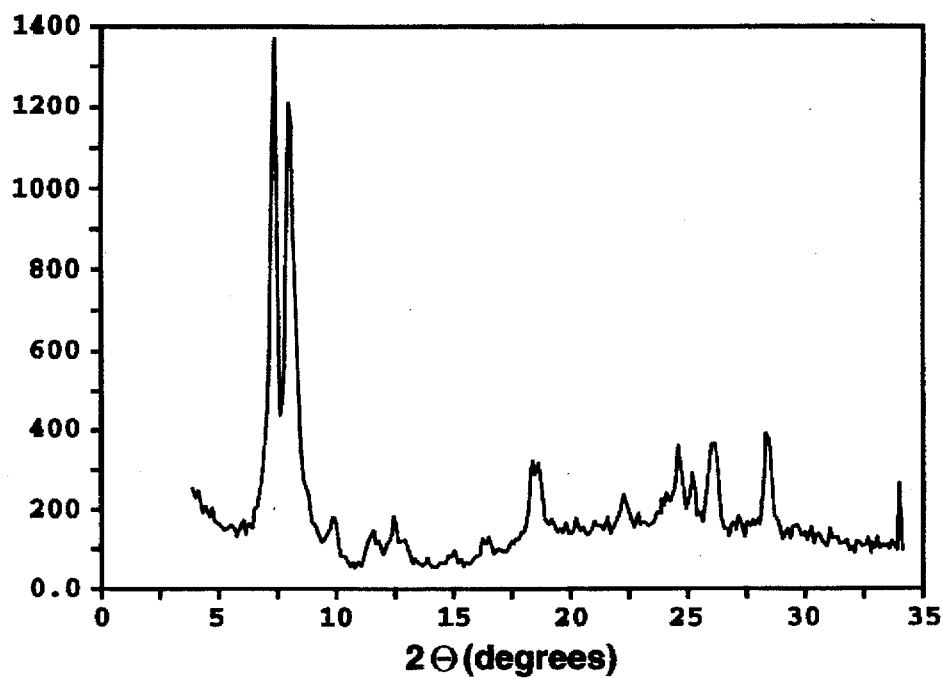
FIG. 3 represents an X-ray powder diffraction trace for the invention hydroxygallium phthalocyanine, Type B polymorph, prepared as described herein using ethanol as solvent.
Figure 4:
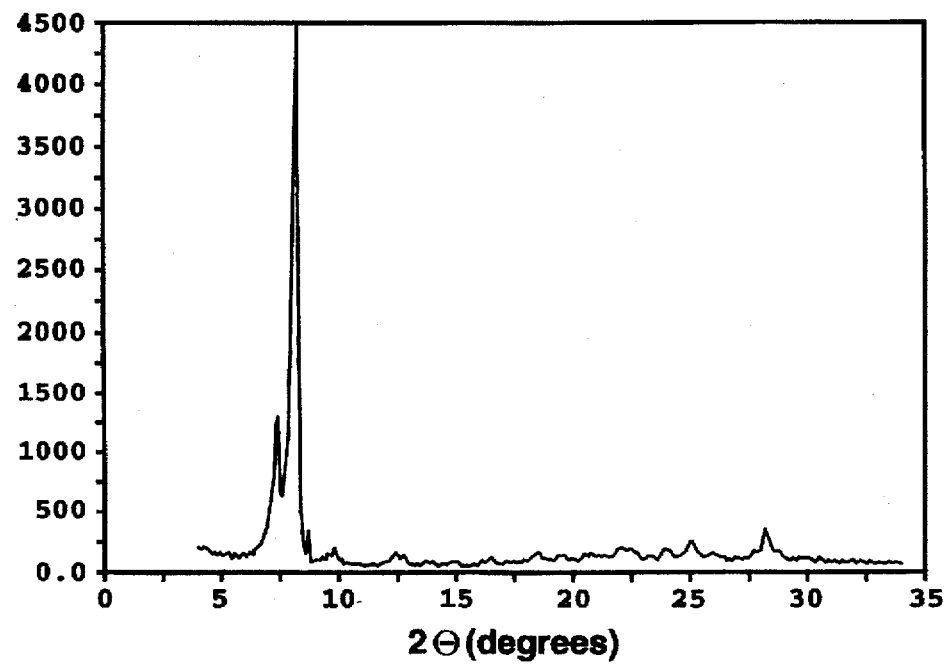
FIG. 4 represents an X-ray powder diffraction trace for the invention hydroxygallium phthalocyanine, Type C polymorph, prepared as described herein using isopropanol as solvent.
Figure 5:
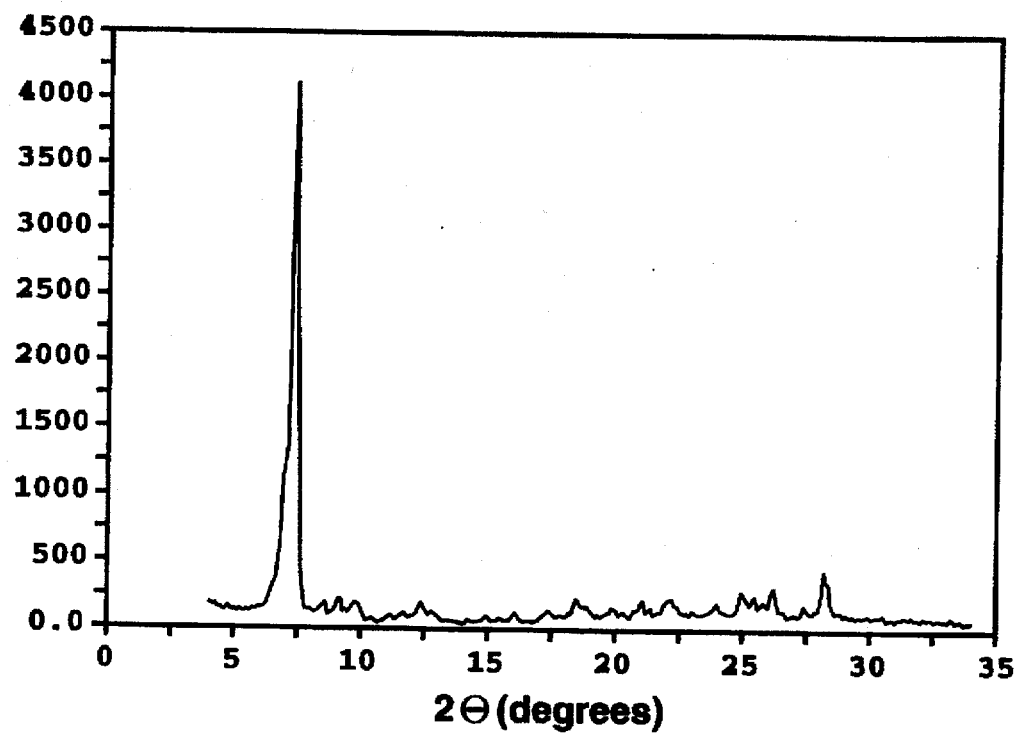
FIG. 5 represents an X-ray powder diffraction trace for the invention hydroxygallium phthalocyanine, Type D polymorph, prepared as described herein using n-butanol as solvent.

These and other objects of the present invention can be accomplished in embodiments thereof by the provision of processes for the preparation of hydroxygallium phthalocyanines and photoresponsive imaging members thereof. More specifically, in embodiments of the present invention there are provided processes for the preparation of hydroxygallium phthalocyanine Type A, B, C or D, which comprises contacting for an effective period of time, such as about 10 to about 180 hours, Type V hydroxygallium phthalocyanine with an aliphatic alcohol, preferably a lower alkyl, that is, for example, with 1 to about 10, and preferably 6 carbon atoms, alcohol, such as methanol, ethanol, propanol, or butanol with milling for an effective period of time, that is until conversion, for example from about 50 to about 96 hours, of the Type V, reference FIG. 1, to a new polymorph of hydroxygallium. The Type V selected for the processes of the present invention can be prepared as illustrated herein, and more specifically, by the reaction of $GaCl_3$ and sodium methoxide solution and o-phthalodinitrile in a suitable solvent, such as toluene and the precursor alkoxy-bridged gallium phthalocyanine dimer, were obtained; hydrolyzing the precursor by dissolving in a strong acid and then reprecipitating the dissolved pigment in, for example, aqueous ammonia, thereby forming Type I hydroxygallium phthalocyanine; and admixing the Type I. Thereafter, the formed Type I can be washed to reduce contaminants like sulfur, or dried azeotropically with a hydrophobic solvent such as hexanes, toluene, butylacetate and the like; followed by treating the Type I either by ball milling or by stirring in DMF with a hydrophobic solvent, such as hexane, and heating to azeotropically remove water. The hydroxygallium phthalocyanine Type I can then be ball milled with DMF or stirred in DMF to provide Type V hydroxygallium phthalocyanine.

In embodiments, the present invention is directed to processes for the preparation of hydroxygallium phthalocyanine Type A, Type B, Type C, or Type D by milling hydroxygallium phthalocyanine Type V with an aliphatic alcohol, and wherein the alcohol is preferably methanol, ethanol, propanol, or butanol, and more preferably methanol, ethanol, isopropanol, or n-butyl alcohol. The photogenerating hydroxygallium phthalocyanine pigments resulting possess in embodiments a wide range of an $E_{1/2}$ of about 2 to about 75 ergs/$cm^2$. Hydroxygallium phthalocyanine Type V can be treated with various solvents (22.9 milliliters) by ball milling the Type V pigment (0.5 gram) with ⅛ inch diameter stainless steel shots (170 grams) in a 60 milliliter bottle. A roll mill can be used for the preparation of the dispersion and wherein such milling is accomplished for about 20 to about 180 hours, and preferably 24 to 144 hours. The solvents can be an alcohol, preferably methanol, ethanol, 1-propanol, isopropanol, n-butanol, 2-butanol, isobutanol, and more preferably, methanol, ethanol, isopropanol and n-butanol. The hydroxygallium phthalocyanine can be obtained by drying the resulting dispersions to remove the solvent. Yield of product is in embodiments from 95 to 99 percent. The crystalline form of alcohol treated hydroxygallium phthalocyanines obtained were characterized by XRPD. Also, the addition of resin polymer, preferably polyvinylbutryal (PVB) (0.26 gram) to the pigment/solvent dispersions, followed by milling for another 2 hours enabled a dispersion for layered photoconductive imaging members, reference for example U.S. Pat. No. 4,265,990, the disclosure of which is totally incorporated herein by reference. A RED DEVIL® paint shaker could also be used wherein 0.8 millimeter diameter glass beads (70 grams) instead of stainless steel shots were selected, 0.5 gram of pigment, solvent (22.9 milliliters) as indicated herein, and thereafter grinding for 0.5 to 10 hours, and preferably 2 to 6 hours.

Numerous different layered photoresponsive imaging members with the hydroxygallium phthalocyanine pigments obtained by the processes of the present invention can be fabricated. In embodiments, thus the layered photoresponsive imaging members are comprised of a supporting substrate, a charge transport layer, especially an aryl amine hole transport layer, and situated therebetween a photogenerator layer comprised of the hydroxygallium phthalocyanine photogenerating pigment. Another embodiment of the present invention is directed to positively charged layered photoresponsive imaging members comprised of a supporting substrate, a charge transport layer, especially an aryl amine hole transport layer, and as a top overcoating layer hydroxygallium phthalocyanine Type A, B, C or D pigment obtained with the processes of the present invention. Moreover, there is provided in accordance with the present invention an improved negatively charged photoresponsive imaging member comprised of a supporting substrate, a thin adhesive layer, Type V hydroxygallium phthalocyanine photogenerator obtained by the processes of the present invention dispersed in a polymeric resinous binder, such as poly(vinyl butyral), and as a top layer aryl amine hole transporting molecules dispersed in a polymeric resinous binder such as polycarbonate.

The photoresponsive imaging members of the present invention can be prepared by a number of known methods, the process parameters and the order of coating of the layers being dependent on the member desired. The imaging members suitable for positive charging can be prepared by reversing the order of deposition of photogenerator and hole transport layers. The photogenerating and charge transport layers of the imaging members can be coated as solutions or dispersions onto selective substrates by the use of a spray coater, dip coater, extrusion coater, roller coater, wire-bar coater, slot coater, doctor blade coater, gravure coater, and the like, and dried at from 40° to about 200° C. for from 10 minutes to several hours under stationary conditions or in an air flow. The coating is accomplished to provide a final coating thickness of from 0.01 to about 30 microns after it has dried. The fabrication conditions for a given layer can be tailored to achieve optimum performance and cost in the final device.

Imaging members of the present invention are useful in various electrostatographic imaging and printing systems, particularly those conventionally known as xerographic processes. Specifically, the imaging members of the present invention are useful in xerographic imaging processes wherein the hydroxygallium phthalocyanine pigment absorbs light of a wavelength of from about 650 to about 900 nanometers, and preferably from about 660 to about 800 nanometers. In these known processes, electrostatic latent images are initially formed on the imaging member followed by development, and thereafter transferring the image to a suitable substrate.

Moreover, the imaging members of the present invention can be selected for electronic printing processes with gallium arsenide light emitting diode (LED) arrays which typically function at wavelengths of from 660 to about 830 nanometers.

One negatively charged photoresponsive imaging member of the present invention is comprised, in the order indicated, of a supporting substrate, an adhesive layer comprised, for example, of a polyester 49,000 available from Goodyear Chemical, a photogenerator layer comprised of the hydroxygallium phthalocyanine obtained with the process of the present invention with isopropanol, or butanol optionally dispersed in an inactive polymer binder, and a hole transport layer thereover comprised of N,N'-diphenyl-N,N'-bis(3-methylphenyl)-1,1'-biphenyl-4,4'-diamine dispersed in a polycarbonate binder, and a positively charged photoresponsive imaging member comprised of a substrate, thereover a charge transport layer comprised of N,N'-diphenyl-N,N'-bis(3-methyl phenyl)-1,1'-biphenyl-4,4'-diamine dispersed in a polycarbonate binder, and a top photogenerator layer comprised of hydroxygallium phthalocyanine obtained with the process of the present invention with isopropanol, or butanol optionally dispersed in an inactive polymer binder.

Examples of substrate layers selected for the imaging members of the present invention can be opaque or substantially transparent, and may comprise any suitable material having the requisite mechanical properties. Thus, the substrate may comprise a layer of insulating material including inorganic or organic polymeric materials, such as MYLAR® a commercially available polymer, MYLAR® containing titanium, a layer of an organic or inorganic material having a semiconductive surface layer, such as indium tin oxide, or aluminum arranged thereon, or a conductive material inclusive of aluminum, chromium, nickel, brass or the like. The substrate may be flexible, seamless, or rigid and many have a number of many different configurations, such as for example a plate, a cylindrical drum, a scroll, an endless flexible belt, and the like. In one embodiment, the substrate is in the form of a seamless flexible belt. In some situations, it may be desirable to coat on the back of the substrate, particularly when the substrate is a flexible organic polymeric material, an anticurl layer, such as for example polycarbonate materials commercially available as MAKROLON®.

The thickness of the substrate layer depends on many factors, including economical considerations, thus this layer may be of substantial thickness, for example over 2,500 microns, or of minimum thickness providing there are no adverse effects on the system. In one embodiment, the thickness of this layer is from about 75 microns to about 275 microns.

The thickness of the hydroxygallium phthalocyanine photogenerator layer depends on a number of factors, including the thicknesses of the other layers and the amount of photogenerator material contained in this layer. Accordingly, this layer can be of a thickness of from about 0.05 micron to about 10 microns when the phthalocyanine photogenerator composition is present in an amount of from about 5 percent to about 100 percent by volume. In embodiments, this layer is of a thickness of from about 0.25 micron to about 1 micron when the photogenerator composition is present in this layer in an amount of 30 to 75 percent by volume. The maximum thickness of this layer in embodiments is dependent primarily upon factors, such as photosensitivity, electrical properties and mechanical considerations. The photogenerator layer can be fabricated by coating a dispersion of the hydroxygallium phthalocyanine obtained with the processes of the present invention in a suitable solvent with or without an optional polymer binder material. The dispersion can be prepared by mixing and/or milling the hydroxygallium phthalocyanine in equipment such as paint shakers, ball mills, sand mills and attritors. Common grinding media such as glass beads, steel balls or ceramic beads may be used in this equipment. The binder resin may be selected from a number of known polymers such as poly(vinyl butyral), poly(vinyl carbazole), polyesters, polycarbonates, poly(vinyl chloride), polyacrylates and methacrylates, copolymers of vinyl chloride and vinyl acetate, phenoxy resins, polyurethanes, poly(vinyl alcohol), polyacrylonitrile, polystyrene, and the like. In embodiments of the present invention, it is desirable to select a coating solvent that does not disturb or adversely affect the other previously coated layers of the device. Examples of solvents that can be selected for use as coating solvents for the photogenerator layer are ketones, alcohols, aromatic hydrocarbons, halogenated aliphatic hydrocarbons, ethers, amines, amides, esters, and the like. Specific examples are cyclohexanone, acetone, methyl ethyl ketone, methanol, ethanol, butanol, amyl alcohol, toluene, xylene, chlorobenzene, carbon tetrachloride, chloroform, methylene chloride, trichloroethylene, tetrahydrofuran, dioxane, diethyl ether, dimethylformamide, dimethylacetamide, butyl acetate, ethyl acetate, methoxyethyl acetate, and the like.

The coating of the photogenerator layer in embodiments of the present invention can be accomplished with spray, dip or wire-bar methods such that the final dry thickness of the photogenerator layer is from 0.01 to 30 microns and preferably from 0.1 to 15 microns after being dried at 40 to 150° C. for 5 to 90 minutes.

Illustrative examples of polymeric binder materials that can be selected for the photogenerator pigment include those polymers as disclosed in U.S. Pat. No. 3,121,006, the disclosure of which is totally incorporated herein by reference.

As adhesives usually in contact with the supporting substrate, there can be selected various known substances inclusive of polyesters, polyamides, poly(vinyl butyral), poly(vinyl alcohol), polyurethane and polyacrylonitrile. This layer is of a thickness of from about 0.001 micron to about 1 micron. Optionally, this layer may contain conductive and nonconductive particles, such as zinc oxide, titanium dioxide, silicon nitride, carbon black, and the like, to provide, for example, in embodiments of the present invention desirable electrical and optical properties.

Aryl amines selected for the hole transporting layer, which generally is of a thickness of from about 5 microns to about 75 microns, and preferably of a thickness of from about 10 microns to about 40 microns, include molecules of the following formula

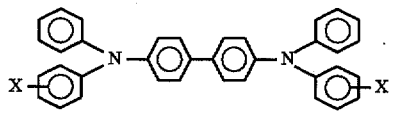

dispersed in a highly insulating and transparent polymer binder, wherein X is an alkyl group or a halogen, especially those substituents selected from the group consisting of Cl and $CH_3$.

Examples of specific aryl amines are N,N'-diphenyl-N, N'-bis(alkylphenyl)-1,1-biphenyl-4,4'-diamine wherein alkyl is selected from the group consisting of methyl, ethyl, propyl, butyl, hexyl, and the like; and N,N'-diphenyl-N,N'-bis(halophenyl)-1,1'-biphenyl-4,4'-diamine wherein the halo substituent is preferably a chloro substituent. Other known charge transport layer molecules can be selected, reference for example U.S. Pat. Nos. 4,921,773 and 4,464,450, the disclosures of which are totally incorporated herein by reference.

Examples of the highly insulating and transparent polymer binder material for the transport layers include materials such as those described in U.S. Pat. No. 3,121,006, the disclosure of which is totally incorporated herein by reference. Specific examples of polymer binder materials include polycarbonates, acrylate polymers, vinyl polymers, cellulose polymers, polyesters, polysiloxanes, polyamides, polyurethanes and epoxies as well as block, random or alternating copolymers thereof. Preferred electrically inactive binders are comprised of polycarbonate resins having a molecular weight of from about 20,000 to about 100,000 with a molecular weight of from about 50,000 to about 100,000 being particularly preferred. Generally, the transport layer contains from about 10 to about 75 percent by weight of the charge transport material, and preferably from about 35 percent to about 50 percent of this material.

Also, included within the scope of the present invention are methods of imaging and printing with the photoresponsive devices illustrated herein. These methods generally involve the formation of an electrostatic latent image on the imaging member, followed by developing the image with a toner composition, reference U.S. Pat. Nos. 4,560,635; 4,298,697 and 4,338,390, the disclosures of which are totally incorporated herein by reference, subsequently transferring the image to a suitable substrate, and permanently affixing the image thereto. In those environments wherein the device is to be used in a printing mode, the imaging method involves the same steps with the exception that the exposure step can be accomplished with a laser device or image bar.

The following Examples are being submitted to illustrate embodiments of the present invention. These Examples are intended to be illustrative only and are not intended to limit the scope of the present invention. Also, parts and percentages are by weight unless otherwise indicated. Comparative Examples are also provided.

EXAMPLE I

Type V

Alkoxy-bridged Gallium Phthalocyanine Dimer Synthesis Using Gallium Methoxide Obtained From Gallium Chloride and Sodium Methoxide In Situ To a 1 liter round bottomed flask were added 25 grams of $GaCl_3$ and 300 milliliters of toluene, and the resulting mixture was stirred for 10 minutes to form a solution. Then, 98 milliliters of a 25 weight percent sodium methoxide solution (in methanol) were added while cooling the flask with an ice bath to keep the contents below 40° C. Subsequently, 250 milliliters of ethylene glycol and 72.8 grams of o-phthalodinitrile were added. The methanol and toluene were quickly distilled off over 30 minutes while heating from 70° to 135° C., and then the phthalocyanine synthesis was performed by heating at 195° C. for 4.5 hours. The alkoxy-bridged gallium phthalocyanine dimer was isolated by filtration at 120° C. The product was then washed with 400 milliliters of DMF at 100° C. for 1 hour and filtered. The product was then washed with 600 milliliters of deionized water at 60° C. for 1 hour and filtered. The product was then washed with 600 milliliters of methanol at 25° C. for 1 hour and filtered. The product was dried at 60° C. under vacuum for 18 hours. The alkoxy-bridged gallium phthalocyanine dimer, 1,2-di(oxogallium phthalocyaninyl) ethane, was isolated as a dark blue solid in 77 percent yield. The dimer product was characterized by elemental analysis, infrared spectroscopy, $^1H$ NMR spectroscopy and X-ray powder diffraction. Elemental analysis showed the presence of only 0.10 percent chlorine. Infrared spectroscopy: major peaks at 573, 611,636, 731,756, 775, 874, 897, 962, 999, 1069, 1088, 1125, 1165, 1289, 1337, 1424, 1466, 1503, 1611, 2569, 2607, 2648, 2864, 2950, and 3045 $cm^{-1}$; $^1H$ NMR spectroscopy ($TFA-d/CDCl_3$ solution, 1: 1 v/v, tetramethylsilane reference): peaks at ($\delta$, ppm±0.01ppm) 4.00 (4H), 8.54 (16H), and 9.62 (16H); X-ray powder diffraction pattern: peaks at Bragg angles (2$\Theta$±0.2°) of 6.7, 8.9, 12.8, 13.9, 15.7, 16.6, 21.2, 25.3, 25.9, and 28.3 with the highest peak at 6.7 degrees.

U.S. Pat. No. 5,466,796, U.S. Pat. No. 5,621,306, U.S. Pat. No. 5,493,016 and U.S. Pat. No. 5,456,998 the disclosures of which are totally incorporated herein by reference, illustrated dimers, hydroxygallium phthalocyanines, processes thereof and imaging members thereof.

Hydrolysis of Alkoxy-bridged Gallium Phthalocyanine to Hydroxygallium Phthalocyanine.

(Type I)

The hydrolysis of the above alkoxy-bridged gallium phthalocyanine to hydroxygallium phthalocyanine was performed as follows. Sulfuric acid (94 to 96 percent, 125 grams) was heated to 40° C. in a 125 milliliter Edenmeyer flask, and then 5 grams of the chlorogallium phthalocyanine were added. Addition of the solid chlorogallium phthalocyanine was completed in approximately 15 minutes, during which time the temperature of the solution increased to about 48° C. The acid solution was then stirred for 2 hours at 40° C., after which it was added in a dropwise fashion to a mixture comprised of concentrated (~30 percent) ammonium hydroxide (265 milliliters) and deionized water (435 milliliters), which had been cooled to a temperature below 5° C. The addition of the dissolved phthalocyanine was completed in approximately 30 minutes, during which time the temperature of the solution increased to about 40° C. The reprecipitated phthalocyanine was then removed from the cooling bath and allowed to stir at room temperature for 1 hour. The resulting phthalocyanine was then filtered through a porcelain funnel fitted with a Whatman 934-AH grade glass fiber filter. The resulting blue solid was redispersed in fresh deionized water by stirring at room temperature for 1 hour and filtered as before. This process was repeated at least three times until the conductivity of the filtrate was <20µS. The filter cake was oven dried overnight, about 20 hours, at 50° C. to provide 4.75 grams (95 percent) of Type I HOGaPc, identified by infrared spectroscopy and X-ray powder diffraction. Infrared spectroscopy: major peaks at 507, 573, 629, 729, 756, 772, 874, 898, 956, 984, 1092, 1121, 1165, 1188, 1290, 1339, 1424, 1468, 1503, 1588, 1611, 1757, 1835, 1951, 2099, 2207, 2280, 2384, 2425, 2570, 2608, 2652, 2780, 2819, 2853, 2907, 2951, 3049 and 3479 (broad) $cm^{-1}$; X-ray diffraction pattern: peaks at Bragg angles 2Θ (2 theta +/−0.2°) of 6.8, 13.0, 16.5, 21.0, 26.3 and 29.5 with the highest peak at 6.8 degrees.

Conversion of Type T Hydroxygallium Phthalocyanine to Type V

The Type I hydroxygallium phthalocyanine pigment obtained above was converted to Type V HOGaPc as follows. The Type I hydroxygallium phthalocyanine pigment (3.0 grams) was added to 25 milliliters of N,N-dimethylformamide in a 60 milliliter glass bottle containing 60 grams of glass beads (0.25 inch in diameter). The bottle was sealed and placed on a ball mill overnight (18 hours). The solid was isolated by filtration through a porcelain funnel fitted with a Whatman GF/F grade glass fiber filter, and washed in the filter using several 25 milliliter portions of acetone. The filtered wet cake was oven dried overnight at 50° C. to provide 2.8 grams of Type V HOGaPc which was identified by infrared spectroscopy and X-ray powder diffraction. Infrared spectroscopy: major peaks at 507,571, 631,733,756,773, 897,965, 1067, 1084, 1121, 1146, 1165, 1291, 1337, 1425, 1468, 1503, 1588, 1609, 1757, 1848, 1925, 2099, 2205, 2276, 2384, 2425, 2572, 2613, 2653, 2780, 2861, 2909, 2956, 3057 and 3499 (broad) $cm^{-1}$; X-ray diffraction pattern: peaks at Bragg angles 2Θ (2 theta +/−0.2°) of 7.4, 9.8, 12.4, 12.9, 16.2, 18.4, 21.9, 23.9, 25.0 and 28.1 with the highest peak at 7.4 degrees.

EXAMPLE II

The hydroxygallium phthalocyanine (V) from Example I was separately treated with various solvents (22.9 milliliters) by ball milling this pigment (0.5 gram) with ⅛ inch diameter stainless steel shots (170 grams) in a 60 milliliter bottle for 68 to 116 hours. The solvents were cyclohexane, toluene, mono-chlorobenzene, methylene chloride, n-butanol, isopropanol, n-butylacetate, tetrahydrofuran, methylethylketone, cyclohexanone, 1,4-dioxane, methanol, and water. The pigment/solvent mixture was removed from the bottle and filtered through a Buchner funnel fitted with a glass fiber filter. The pigment collected was dried at 60° C. for 12 hours and submitted for X-ray powder diffraction analysis. The results are shown in Table 1. Some of the solvents studied were effective in producing new polymorphs. They were predominantly alcohols such as methanol, isopropanol and n-butanol. In addition, water and 1,4-dioxane also caused some change in the polymorphic form.

TABLE 1

| Experiment No. | Solvents | Time (hours) | XRD Polymorphic Type |
|---|---|---|---|
| 1 | no | | V (ref.) |
| 2 | cyclohexane | 96 | no change |
| 3 | toluene | 96 | no change |
| 4 | chlorobenzene | 96 | no change |
| 5 | dichloromethane | 96 | no change |
| 6 | n-butanol | 96 | change |
| 7 | isopropanol | 116 | change |

TABLE 1-continued

| Experiment No. | Solvents | Time (hours) | XRD Polymorphic Type |
|---|---|---|---|
| 8 | n-butylacetate | 96 | no change |
| 9 | tetrahydrofuran | 96 | no change |
| 10 | methylethylketone | 96 | no change |
| 11 | cyclohexanone | 68 | no change |
| 12 | 1,4-dioxane | 116 | change |
| 13 | methanol | 116 | change |
| 14 | water | 116 | change |

EXAMPLE III

The alcohol treatment of hydroxygallium phthalocyanines (V) was accomplished with methanol, ethanol, isopropanol and n:butanol by essentially repeating the process of Example II. The milling time was 96 hours. Typical XRPD traces of hydroxygallium phthalocyanines (V), FIG. 1, by contacting Type V with above solvents at 96 hours milling are shown in FIGS. 2, 3, 4 and 5, and the positions of major peaks are provided in Table 2. Significant changes in XRPD pattern for the alcohol treated HOGaPc samples were observed.

TABLE 2

| X-Ray Powder Diffraction Pattern | | | |
|---|---|---|---|
| Experiment No. | Solvents | Time (hours) | XRD (2Θ degree) |
| 1 | no | | 7.3,9.8,12.3,12.8,16.1,18.5,21.9, 23.9,25.0,26.2,28.2 |
| 15 | methanol | 96 | 6.9,7.7,8.4,12.0,13.2,24.3,26.6, 27.5 |
| 16 | ethanol | 96 | 7.4,8.2,9.9,12.4,16.4,18.5,22.3, 24.6,26.1,28.3 |
| 17 | isopropanol | 96 | 7.3,8.1,9.9,12.4,22.3,25.1,28.2 |
| 18 | n-butanol | 96 | 7.1,7.4,9.1,9.9,12.4,18.5,22.2, 25.0,26.2,28.2 |

EXAMPLE IV

The above prepared alcohol treated invention hydroxygallium phthalocyanines can be selected as photogenerating layers for layered photoresponsive imaging members, which members were prepared by the following procedure. There was provided on a titanized MYLAR® substrate, 75 microns thick, a silane layer (gamma-aminopropyl methyl diethoxysilane) 0.05 micron in thickness, and on the silane layer, a polyester adhesive layer thereon in a thickness of 0.05 micron. To the dispersions of hydroxygallium phthalocyanines (HOGaPc) of Example III in a 60 milliliter glass jar containing 170 grams of ⅛ inch stainless steel shots was added 0.26 gram of poly(vinyl butyral), and milling was continued for another 2 hours. Subsequently, the dispersion was coated onto the adhesive/silane layer using a number 6 wire-wound applicator. The formed photogenerating layer HOGaPc was dried at 100° C. for 10 minutes to a final thickness of about 0.20 micron.

A hole transporting layer solution was prepared by dissolving 6.34 grams of N,N'-diphenyl-N,N-bis(3-methyl phenyl)-1,1'-biphenyl-4,4'-diamine, and 6.34 grams of polycarbonate in 72 grams of dichloromethane. The solution was coated onto the HOGaPc generator layer using a 10 mil film applicator. The charge transporting layer thus obtained was dried at 115° C. for 60 minutes to provide a final thickness of about 27 microns.

The xerographic electrical properties (Table 3) of photoresponsive imaging members prepared as described above were determined by electrostatically charging the surface thereof with a corona discharge source until the surface potential, as measured by a capacitatively coupled probe attached to an electrometer, attained an initial dark value, $V_0$, of −800 volts. After resting for 0.5 second in the dark, the charged member reached a surface potential, $V_{ddp}$, or dark development potential. The member was then exposed to filtered light from a Xenon lamp. A reduction in surface potential from $V_{ddp}$ to a background potential, $V_{bg}$, due to the photodischarge effect was observed. The dark decay in volts per second was calculated as $(V_0-V_{ddp})/0.5$. The percent of photodischarge was calculated as $100 \times (V_{ddp}-V_{bg})/V_{ddp}$. The half exposure energy, that is $E_{1/2}$, the amount of exposure energy causing reduction of the $V_{ddp}$ to half of its initial value, was determined. The wavelength of light selected was 780 nanometers.

In Table 3 that follows, there is presented information and data for layered imaging members identified as Device numbers 3, 7, 11 and 15, which members are comprised of the components illustrated in the above Example.

TABLE 3

XEROGRAPHIC ELECTRICAL EVALUATIONS

| Device No. | Solvent | Milling Time (hours) | $V_{ddp}$ (V) | Dark Decay (V/s) | $E_{1/2}$ (ergs/cm$^2$) |
|---|---|---|---|---|---|
| 3 | methanol | 96 | 825 | 50.6 | 26.0 |
| 7 | ethanol | 96 | 811 | 23.6 | 5.6 |
| 11 | isopropanol | 96 | 809 | 14.4 | 7.2 |
| 15 | n-butanol | 96 | 807 | 12.8 | 4.3 |

EXAMPLE V

Milling Time Effect

The photosensitivity of alcohol treated hydroxygallium phthalocyanine samples can be varied according to the milling conditions. In accordance with Example II, samples, about 100 grams, of HOGaPc (V) were milled in methanol, ethanol, isopropanol and 1-butanol for 24, 48, 96 and 144 hours. Photoresponsive imaging members were fabricated as indicated herein, reference the above Examples, and the xerographic electrical properties were determined following the process of Example IV. The xerographic electrical results of the HOGaPc samples milled at different times are summarized in Table 4. The results indicate that the photosensitivity can be adjusted according to the type of alcohol and milling time used.

TABLE 4

XEROGRAPHIC ELECTRICAL EVALUATIONS

| Device No. | Solvent | Milling Time (hours) | $V_{ddp}$ (V) | Dark Decay (V/s) | $E_{1/2}$ (ergs/cm$^2$) |
|---|---|---|---|---|---|
| 1 | methanol | 24 | 816 | 38.8 | 19.0 |
| 2 | | 48 | 818 | 51.2 | 17.2 |
| 3 | | 96 | 825 | 50.6 | 26.0 |
| 4 | | 144 | 816 | 31.0 | 75.0 |
| 5 | ethanol | 24 | 806 | 14.0 | 2.5 |
| 6 | | 48 | 811 | 6.2 | 3.3 |
| 7 | | 96 | 811 | 23.6 | 5.6 |
| 8 | | 144 | 815 | 27.4 | 9.9 |

TABLE 4-continued

XEROGRAPHIC ELECTRICAL EVALUATIONS

| Device No. | Solvent | Milling Time (hours) | $V_{ddp}$ (V) | Dark Decay (V/s) | $E_{1/2}$ (ergs/cm$^2$) |
|---|---|---|---|---|---|
| 9 | isopropanol | 24 | 806 | 10.6 | 2.5 |
| 10 | | 48 | 808 | 16.6 | 2.8 |
| 11 | | 96 | 809 | 14.4 | 7.2 |
| 12 | | 144 | 807 | 12.4 | 19.5 |
| 13 | n-butanol | 24 | 804 | 7.0 | 2.2 |
| 14 | | 48 | 805 | 8.6 | 2.8 |
| 15 | | 96 | 807 | 12.8 | 4.3 |
| 16 | | 144 | 806 | 13.4 | 8.6 |

EXAMPLE VI

This Example relates to a process for the preparation of hydroxygallium phthalocyanine dispersions in methanol, ethanol, isopropanol and n-butanol with a RED DEVIL® paint shaker. In a 60 milliliter glass jar containing 70 grams of 0.8 millimeter diameter glass beads was added 0.5 gram of hydroxygallium phthalocyanine Type V, which was obtained from Example I, 22.9 milliliters of a selected alcohol and 0.26 gram of poly(vinyl butyral) B30H from Hoechst. The glass jar was then shaken in the RED DEVIL® paint shaker. Aliquots of dispersion were withdrawn from the bottle at 2.5 and 6.0 hours. Photoresponsive imaging members were then prepared from these dispersions and xerographically evaluated in accordance with the procedures described in Example IV.

In Table 5, there are presented information and data for layered imaging members identified as Device numbers 17 through 24.

TABLE 5

XEROGRAPHIC ELECTRICAL EVALUATIONS

| Device No. | Solvent | Milling Time (hours) | $V_{ddp}$ (V) | Dark Decay (V/s) | $E_{1/2}$ (ergs/cm$^2$) |
|---|---|---|---|---|---|
| 17 | methanol | 2.5 | 805 | 5.4 | 3.14 |
| 18 | | 6 | 800 | 2.0 | 5.32 |
| 19 | ethanol | 2.5 | 802 | 3.0 | 2.76 |
| 20 | | 6 | 804 | 2.0 | 3.69 |
| 21 | isopropanol | 2.5 | 803 | 2.0 | 2.38 |
| 22 | | 6 | 803 | 3.6 | 3.36 |
| 23 | n-butanol | 2.5 | 803 | 2.0 | 1.96 |
| 24 | | 6 | 805 | 2.8 | 2.08 |

Other embodiments and modifications of the present invention may occur to those skilled in the art subsequent to a review of the present application, and the information presented herein; these embodiments and modifications, as well as equivalents thereof, are also included within the scope of this invention.

What is claimed is:

1. A process for the preparation of hydroxygallium phthalocyanines Type A, Type B, Type C, or Type D, which comprises contacting Type V hydroxygallium phthalocyanine with an alcohol.

2. A process in accordance with claim 1 wherein the alcohol is an aliphatic alcohol with from 1 to about 6 carbon atoms.

3. A process in accordance with claim 1 wherein the alcohol is methanol.

4. A process in accordance with claim 1 wherein the alcohol is ethanol, or propanol.

5. A process in accordance with claim 1 wherein the alcohol is butanol.

6. A process in accordance with claim 2 wherein the contacting is for a period of from about 1 to about 336 hours.

7. A process in accordance with claim 3 wherein the contacting is for a period of from about 1 to about 336 hours.

8. A process in accordance with claim 4 wherein the contacting is for a period of from about 1 to about 336 hours.

9. A process in accordance with claim 5 wherein the contacting is for a period of from about 1 to about 336 hours.

10. A process in accordance with claim 1 wherein the weight ratio of Type V to alcohol solvent selected is from about 1 to about 50 weight percent.

11. A process in accordance with claim 1 wherein the contacting is by mixing, milling, paint shaking, or kneading.

12. A process in accordance with claim 3 wherein the hydroxygallium phthalocyanine Type A obtained has major peaks, as measured with an X-ray diffractometer, at Bragg angles 2Θ 6.9°, 7.7°, 8.4°, 12.0°, 13.2°, 24.3°, 26.6° and 27.5°.

13. A process in accordance with claim 3 wherein the hydroxygallium phthalocyanine Type B obtained has major peaks, as measured with an X-ray diffractometer, at Bragg angles 2Θ 7.4°, 8.2°, 9.9°, 12.4°, 16.4°, 18.5°, 22.3°, 24.6°, 26.1° and 28.3°.

14. A process in accordance with claim 5 wherein the hydroxygallium phthalocyanine Type C obtained has major peaks, as measured with an X-ray diffractometer, at Bragg angles 2Θ 7.3°, 8.1°, 9.9°, 12.4°, 22.3°, 25.1° and 28.2.

15. A process in accordance with claim 5 wherein the hydroxygallium phthalocyanine Type D obtained has major peaks, as measured with an X-ray diffractometer, at Bragg angles 2Θ 7.1°, 7.4°, 9.1°, 9.9°, 12.4°, 18.5°, 22.2°, 25.0°, 26.2°, and 28.2°.

16. A process in accordance with claim 1 wherein the alcohol is isopropanol.

17. A process in accordance with claim 1 wherein the alcohol is 1-butanol.

18. A process in accordance with claim 1 wherein the contacting is for a period of from about 1 to about 144 hours.

19. A process for the preparation of hydroxygallium phthalocyanine Type A, Type B, Type C, or Type D, which comprises mixing Type V hydroxygallium phthalocyanine with an aliphatic alcohol and wherein the Type V selected is prepared by the reaction of a gallium trichloride ($GaCl_3$) sodium methoxide solution, and o-phthalodinitrile in a solvent to obtain the precursor alkoxy-bridged gallium phthalocyanine dimer; hydrolyzing the precursor by dissolving it in a strong acid and then reprecipitating the dissolved pigment in aqueous ammonia, thereby forming Type I hydroxygallium phthalocyanine; and ballmilling the hydroxygallium phthalocyanine Type I to provide Type V hydroxygallium phthalocyanine.

20. A process in accordance with claim 19 wherein the solvent for the reaction of a gallium trichloride ($GaCl_3$) sodium methoxide solution and o-phthalodinitrile is toluene; washing, or azeotropically drying the formed Type I to remove contaminants; followed by treating the Type I either by ball milling or by stirring in dimethylformamide (DMF) with a hydrophobic solvent of hexane, and heating to azeotropically remove water; and the strong acid is sulfuric acid.

21. A process in accordance with claim 19 wherein the ballmilling of the hydroxygallium phthalocyanine Type I is accomplished in the presence of dimethylformamide.

22. A process in accordance with claim 1 wherein the Type V selected is prepared by the reaction of a gallium trichloride ($GaCl_3$) sodium methoxide solution, and o-phthalodinitrile in a solvent to obtain the precursor alkoxy-bridged gallium phthalocyanine dimer; hydrolyzing the precursor by dissolving it in a strong acid and then reprecipitating the dissolved hydroxygallium phthalocyanine pigment in aqueous ammonia, thereby forming Type I hydroxygallium phthalocyanine; and ballmilling the hydroxygallium phthalocyanine Type I to provide Type V hydroxygallium phthalocyanine.

* * * * *